(12) United States Patent      (10) Patent No.: US 7,574,547 B1
Avudaiyappan      (45) Date of Patent: Aug. 11, 2009

(54) RING COUNTER BASED STARVATION FREE WEIGHTED PRIORITY ENCODED ARBITER

(75) Inventor: Karthikeyan Avudaiyappan, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 131 days.

(21) Appl. No.: 11/779,202

(22) Filed: Jul. 17, 2007

(51) Int. Cl. *G06F 12/00* (2006.01)
(52) U.S. Cl. .................. 710/244; 710/116; 370/395.42
(58) Field of Classification Search ............... 370/395.41–395.42; 710/241, 243–244, 113–118
See application file for complete search history.

(56) References Cited

U.S. PATENT DOCUMENTS 6,233,645 B1 * 5/2001 Chrysos et al. ............. 710/244

\* cited by examiner

*Primary Examiner*—Clifford H Knoll

(74) *Attorney, Agent, or Firm*—Martine Penilla & Gencarella, LLP

(57) ABSTRACT

The embodiments provide an arbiter in a microprocessor that can handle requests to access a shared resource from function units with different priorities without starving the access opportunities of requests from function units with low priority. In one embodiment, a microprocessor is provided. The microprocessor includes a shared resource and a plurality of requesting entities accessing the shared resource. Each of the plurality of requesting entities has a priority value and requests from the each of the plurality of requesting entities are assigned the priority value. The plurality of requesting entities are function units of the microprocessor. The microprocessor also includes a priority-encode arbiter with an adjustable ring counter disposed between the shared resource and the plurality of requesting entities to control the access requests of the plurality of requesting entities to the shared resource. The adjustable ring counter includes arbitration logic circuitry coupled to a plurality of memory cells being coupled in series. The plurality of memory cells have a first memory cell and a last memory cell. The first memory cell is coupled to a multiplexer. The last memory cell is coupled to the shared resource. There are a plurality of return paths, each of the plurality of return path being coupled to a memory cell at one end and the multiplexer at the other end.

20 Claims, 9 Drawing Sheets

| Requesting Entity | Request | Time Slot |
|---|---|---|
| $RE_0$ | $R_{01}$ | $t_6$ |
| $RE_1$ | $R_{11}$ | $t_7$ |
| $RE_2$ | $R_{21}$ | $t_8$ |
| $RE_3$ | $R_{31}$ | $t_9$ |
| $RE_0$ | $R_{02}$ | $t_{10}$ |
| $RE_1$ | $R_{12}$ | $t_{11}$ |
| $RE_0$ | $R_{03}$ | $t_{12}$ |

| Requesting Entity | Request | Time Slot |
|---|---|---|
| $RE_0$ | $R_{01}$ | $t_6$ |
| $RE_0$ | $R_{02}$ | $t_7$ |
| $RE_0$ | $R_{03}$ | $t_8$ |
| $RE_0$ | $R_{04}$ | $t_9$ |
| $RE_0$ | $R_{05}$ | $t_{10}$ |
| $RE_1$ | $R_{11}$ | $t_{11}$ |
| $RE_1$ | $R_{12}$ | $t_{12}$ |

|     | $F_0$ | $F_1$ | $F_2$ | $F_3$ | $F_4$ | $F_5$ |
|-----|-----|-----|-----|-----|-----|-----|
| $T_0$ | 1 | 0 | 0 | 0 | 0 | 0 |
| $T_1$ | 0 | 1 | 0 | 0 | 0 | 0 |
| $T_2$ | 0 | 0 | 1 | 0 | 0 | 0 |
| $T_3$ | 0 | 0 | 0 | 1 | 0 | 0 |
| $T_4$ | 0 | 0 | 0 | 0 | 1 | 0 |
| $T_5$ | 0 | 0 | 0 | 0 | 0 | 1 |
| $T_6$ | 1 | 0 | 0 | 0 | 0 | 0 |

$T_0 \quad F_0 = 1 \longrightarrow r_0$ $T_1 \quad F_1 = 1 \longrightarrow r_1$ $T_2 \quad F_2 = 1 \longrightarrow r_2$ $T_3 \quad F_3 = 1 \longrightarrow r_3$ $T_4 \quad F_4 = 1 \longrightarrow r_4$ $T_5 \quad F_5 = 1 \longrightarrow r_5$

| | | |
|---|---|---|
| $T_0$ | $F_0 = 1$ ⟶ $r_{01}$ |
| $T_1$ | $F_1 = 1$ ⟶ $r_{11}$ |
| $T_2$ | $F_2 = 1$ ⟶ $r_{21}$ |
| $T_3$ | $F_3 = 1$ ⟶ $r_{02}$ |
| $T_4$ | $F_4 = 1$ ⟶ $r_{03}$ |
| $T_5$ | $F_5 = 1$ ⟶ $r_{12}$ |

RING COUNTER BASED STARVATION FREE WEIGHTED PRIORITY ENCODED ARBITER

BACKGROUND

Microprocessor is a device that integrates the functions of the central processing unit (CPU) of a computer onto one semiconductor chip or integrated circuit (IC). Microprocessor contains the core elements of a computer system, and is the computation and control engine of the computer system. Only a power supply, memories, peripheral interface ICs, and peripherals (typically input/output and storage devices) need be added to build a complete computer system.

A microprocessor consists of multiple internal function units, such as: an arithmetic logic unit (ALU), control units, memories, memory interfaces between external and internal memories, interrupt or exception controllers, and internal caches. Other function units that assist in floating-point match calculations, program branching, or vector processing may also be included. The function units of the microprocessor work independently or interact with one another to complete tasks.

Multiple function units share and access resources, such as memories, caches, on the microprocessor in order to complete tasks. When multiple function units need to access a shared resource at the same time, an arbiter is needed to decide which function unit will access the share resource first, or second, etc. Tasks performed by some function units are considered to have higher importance (or priority) than tasks performed by other function units. The requests to access the shared resources by these function units of higher importance should be granted before the requests from than the function units with less importance. However, granting accesses to the requests from function units with high importance before granting accesses to the requests from function units of less importance could lead to starvation of access opportunities to the shared resources of requests from function units with less importance (or priority).

As a consequence, there is a need for an arbiter in a microprocessor that can handle requests from function units with different priorities without starving the access opportunities of requests from function units with low priority.

SUMMARY

Broadly speaking, the embodiments of the present invention fills the need for an arbiter in a microprocessor that can handle requests to access a shared resource from function units with different priorities without starving the access opportunities of requests from function units with low priority. The embodiments provide methods and apparatus using an arbiter with ring counter with variable length to control the percentage of access assigned to requests from function units of high priorities. The remaining percentage of access is divided evenly among requests from all function units with no differentiation of priority. The methods and apparatus using the arbiter grant access to requests from function units with different priorities without starving the access opportunities of requests from function units with low priority. At the same time, requests from function units with higher priority are granted accesses to the shared resource at higher rates than requests from function units with lower priorities.

It should be appreciated that the present invention can be implemented in numerous ways, including as a process, an apparatus, a system, a device, or a method. Several inventive embodiments of the present invention are described below.

In one embodiment, a microprocessor is provided. The microprocessor includes a shared resource and a plurality of requesting entities accessing the shared resource. Each of the plurality of requesting entities has a priority value and requests from the each of the plurality of requesting entities are assigned the priority value. The plurality of requesting entities are function units of the microprocessor. The microprocessor also includes a priority-encode arbiter with an adjustable ring counter disposed between the shared resource and the plurality of requesting entities to control the access requests of the plurality of requesting entities to the shared resource. The adjustable ring counter includes arbitration logic circuitry coupled to a plurality of memory cells being coupled in series. The plurality of memory cells have a first memory cell and a last memory cell. The first memory cell is coupled to a multiplexer. The last memory cell is coupled to the shared resource. There are a plurality of return paths, each of the plurality of return path being coupled to a memory cell at one end and the multiplexer at the other end.

In another embodiment, a priority-encoded arbiter with an adjustable ring counter to arbitrate requests to access a shared resource is provided. The priority-encoded arbiter with the adjustable ring counter includes arbitration logic circuitry. The arbitration logic circuitry recognizes priority values associated with the requests. The priority-encoded arbiter with the adjustable ring counter also includes a plurality of memory cells coupled in series. The plurality of memory cells are coupled to the arbitration logic circuitry. The plurality of memory cells have a first memory cell and a last memory cell. The priority-encoded arbiter with the adjustable ring counter further includes a multiplexer. The first memory cell is coupled to the multiplexer and the last memory cell is coupled to the shared resource. There are a plurality of return paths, each of the plurality of return path being coupled to a memory cell at one end and the multiplexer at the other end.

In yet another embodiment, a microprocessor is provided. The microprocessor includes a shared resource, and a plurality of requesting entities accessing the shared resource. Each of the plurality of requesting entities has an associated priority value and requests from the each of the plurality of requesting entities are assigned the associated priority value. The plurality of requesting entities are function units of the microprocessor. The microprocessor also includes a priority-encoded arbiter with an adjustable ring counter disposed between the shared resource and the plurality of requesting entities to control the access requests of the plurality of requesting entities to the shared resource. The priority-encoded arbiter with the adjustable ring counter grants more access to requests with higher priority values and does not starve access of the requests with lower priority values.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1A:
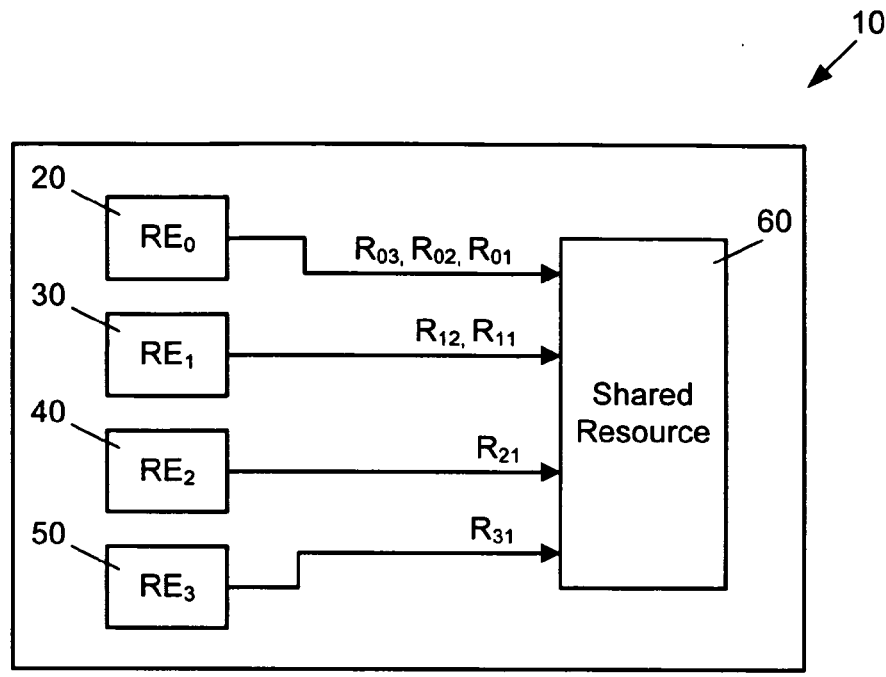
FIG. 1A shows a microprocessor with a number of function units, in accordance with one embodiment of the present invention.

FIG. 1A shows a microprocessor 10 with a number of functional units 20, 30, 40, 50 requesting access to a shared resource 60 on the microprocessor 10, in accordance with one embodiment of the current invention. The shared resource 60 can be a cache, a memory, or other types shared resources. The functional units 20, 30, 40 and 50 are considered requesting entity 0 ($RE_0$), requesting entity 1 ($RE_1$), requesting entity 2 ($RE_2$), and requesting entity 3 ($RE_3$). $RE_0$, $RE_1$, $RE_2$, and $RE_3$ makes access requests $R_{01}$, $R_{02}$, $R_{03}$, $R_{11}$, $R_{12}$, $R_{21}$, and $R_{31}$ that arrive at the shared resource 60 at about the same time. Since multiple requests arriving at shared resource 60 at about the same time, there need to be an arbitration unit (or arbiter) to determine in what order the requests are granted access to the shared resource 60.

Figure 1B:
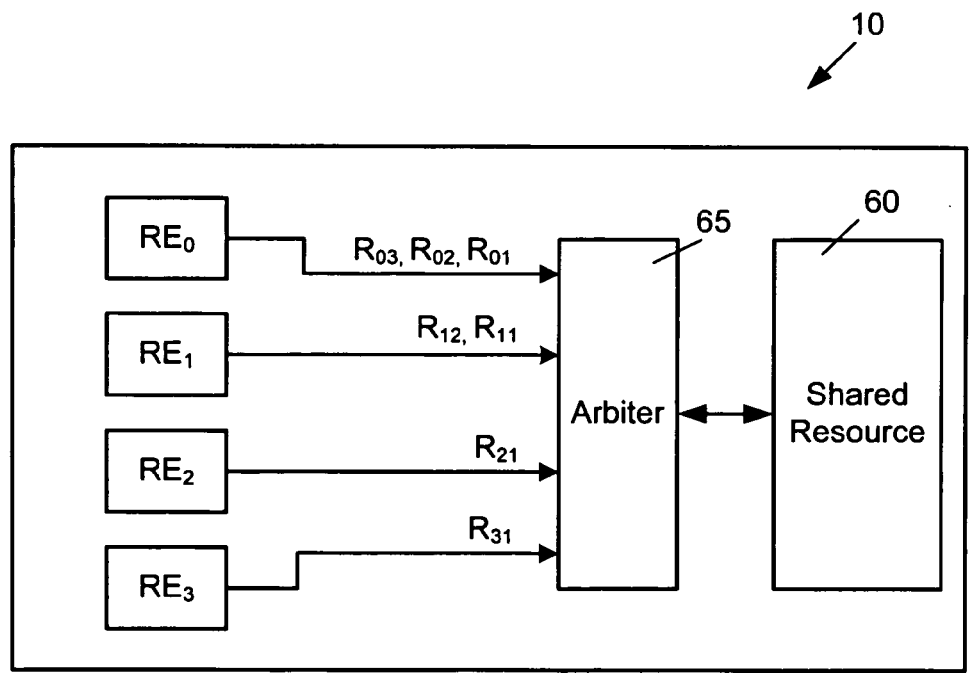
FIG. 1B shows an arbiter placed between a shared resource and requesting entities, in accordance with one embodiment of the present invention.

FIG. 1B shows that an arbiter 65 is placed between the shared resource 60 and requesting entities $RE_0$, $RE_1$, $RE_2$, and $RE_3$, in accordance with one embodiment of the present invention. The arbiter 65 has arbitration logic circuitry to determine the order the requests, such as request $R_{01}$, $R_{02}$, $R_{03}$, $R_{11}$, $R_{12}$, $R_{21}$, and $R_{31}$, are granted access to shared resource 60. One simple arbitration scheme is called "round robin" arbitration, which assigns a time slice to a request from a request entity in sequence. For example, in "round robin" arbitration, an arbiter assign time slices in the following sequence: $R_{01}$ of $RE_0$, $R_{11}$ of $RE_1$, $R_{21}$ of $RE_2$, and $R_{31}$ of $RE_3$. After a requesting unit of each requesting entity is assigned a time slice, the "round robin" arbiter repeats assignment of time slices to each requesting entity again. For an arbiter applying "round robin" scheme, all requesting entities are treated equally. There is no priority differentiation among the requesting entities. "Round robin" is both simple and easy to implement, and starvation-free, which means requests from requesting entities are not starved of access opportunities.

Figures 1C, 1D:
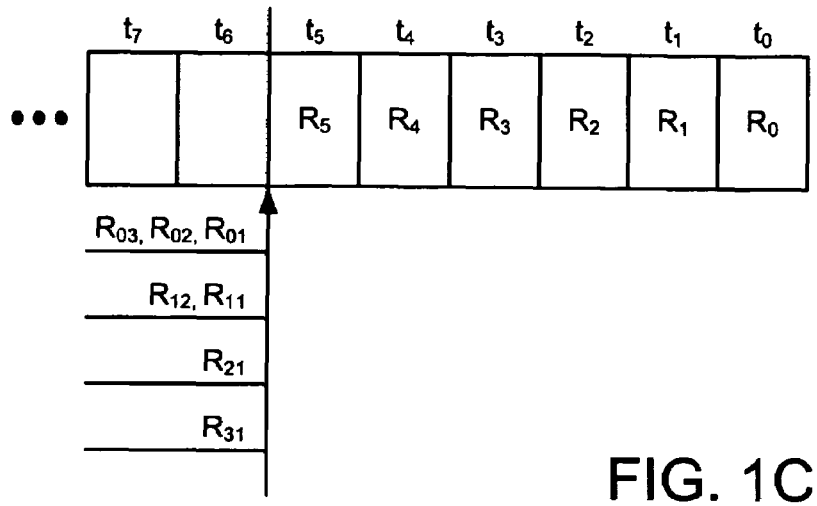
FIG. 1C shows time slot assignments for different requests to access the shared resources, in accordance with one embodiment of the present invention.
FIG. 1D shows each incoming request being assigned a time slot, in accordance with one embodiment of the present invention.

FIG. 1C shows time slot assignments for different requests to access the shared resources, in accordance with one embodiment of the present invention. Time slots $t_0$, $t_1$, $t_2$, $t_3$, $t_4$, and $t_5$ have already been assigned to requests $R_0$, $R_1$, $R_2$, $R_3$, $R_4$, and $R_5$, respectively. $R_0$, $R_1$, $R_2$, $R_3$, $R_4$, and $R_5$ are requests from requesting entities, $RE_0$, $RE_1$, $RE_2$, $RE_3$. Requests $R_{01}$, $R_{02}$, $R_{03}$, $R_{11}$, $R_{12}$, $R_{21}$, and $R_{31}$ are lined up to be assigned time slots at t6 and beyond. According to "round robin", one incoming request of each requesting entity, $RE_0$, $RE_1$, $RE_2$, $RE_3$, is assigned a time slot, $t_6$, $t_7$, $t_8$, $t_9$. If a requesting entity does not have additional requests, the time slot is assigned to the next requesting entity. As shown in FIG. 1D, incoming requests, $R_{01}$, $R_{11}$, $R_{21}$, $R_{31}$, $R_{02}$, $R_{12}$, $R_{03}$, are assigned time slots, $t_6$, $t_7$, $t_8$, $t_9$, $t_{10}$, $t_{11}$, $t_{12}$, sequentially, in accordance with one embodiment of the present invention.

However, as described above some requesting entities (REs) (or functional units) have higher priorities than other requesting entities. For example, a cache miss request from instruction cache to level 2 cache has higher priority than a cache miss request from data cache. In the embodiment shown in FIG. 1C, $RE_0$ has higher priority than $RE_1$, and $RE_1$ has higher priority than $RE_2$ and $RE_3$. $RE_2$ and $RE_3$ have same level of priority. In one embodiment, the priorities of $RE_0$, $RE_1$, $RE_2$, and $RE_3$ are identified by priority values associated with the requesting entities. Under this circumstance, a priority-encoded arbitration can be used. In priority-encoded arbitration, the requesting entity with a higher priority is given more "weight" and has higher priority to access the shared resource 60 than other requesting entities with lower priorities. In one embodiment, the requests are coded with priority (or weight). The arbiter 65 recognizes the "weight" associated with each request from a particular requesting entity and grants the request with higher "weight" access to the shared resource before the request with lower "weight". This arbitration scheme allows requests with higher priorities (or from requesting entities with higher priorities) get taken care of ahead of lower priority requests (or from requesting entities with lower priorities). However, if there are continuously many high priority requests, such as $R_{01}$, $R_{02}$, $R_{03}$, $R_{11}$, $R_{12}$, low priority requests, such as $R_{21}$, $R_{31}$, might not have chances to access the shared resource 60.

Figures 1E, 1F:
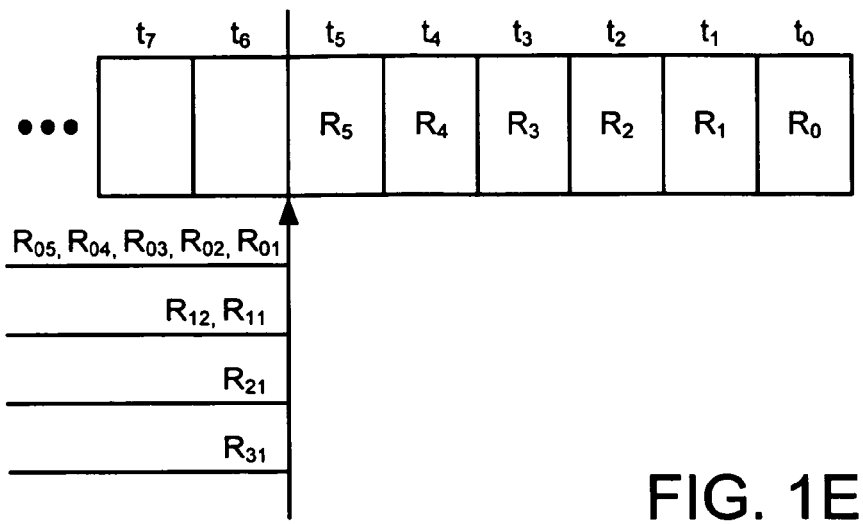
FIG. 1E shows time slot assignments for different requests to access the shared resources, in accordance with another embodiment of the present invention.
FIG. 1F shows each incoming request being assigned a time slot, in accordance with another embodiment of the present invention.

FIG. 1E shows time slot assignments for different requests to access the shared resources, in accordance with one embodiment of the present invention. Requests $R_{01}$, $R_{02}$, $R_{03}$, $R_{04}$, and $R_{05}$ from $RE_0$, $R_{11}$, and $R_{12}$ from $RE_1$, $R_{21}$ from $RE_2$, and $R_{31}$ from $RE_3$ are lined up to be assigned a time slot at t6 and beyond. According to "priority encoded arbitration", the arbiter chooses a high-priority request, such as $R_{01}$, at time of assigning the time slot of $t_6$. The time slot assignment for $t_6$, $t_7$, $t_8$, $t_9$, $t_{10}$, $t_{11}$, and $t_{12}$ are shown in FIG. 1F, in accordance with one embodiment of the present invention. High priority requests $R_{01}$, $R_{02}$, $R_{03}$, $R_{04}$, $R_{05}$, $R_{11}$, and $R_{12}$ are all assigned time slots. For the remaining low priority requests $R_{21}$ and $R_{31}$, when the next time slot become available, $R_{21}$ and $R_{31}$ might be assigned a time slot, if there is no additional requests coming from high priority requesting entities, such as $RE_0$ or $RE_1$. However, if there are additional requests coming from high priority requesting entities, such as $RE_0$ or $RE_1$, the time slots will be assigned to requests from those high priority requesting entities. $R_{21}$ and $R_{31}$ would be "starved" of the opportunities to access the shared resource.

This creates starvation of access opportunity for low priority requesting entities, which is undesirable since the tasks related to the low priority requests would not be completed without accessing the shared resource. Therefore, there is a need for a priority-encoded arbiter that is free of starvation of low priority requests.

Figure 2A:
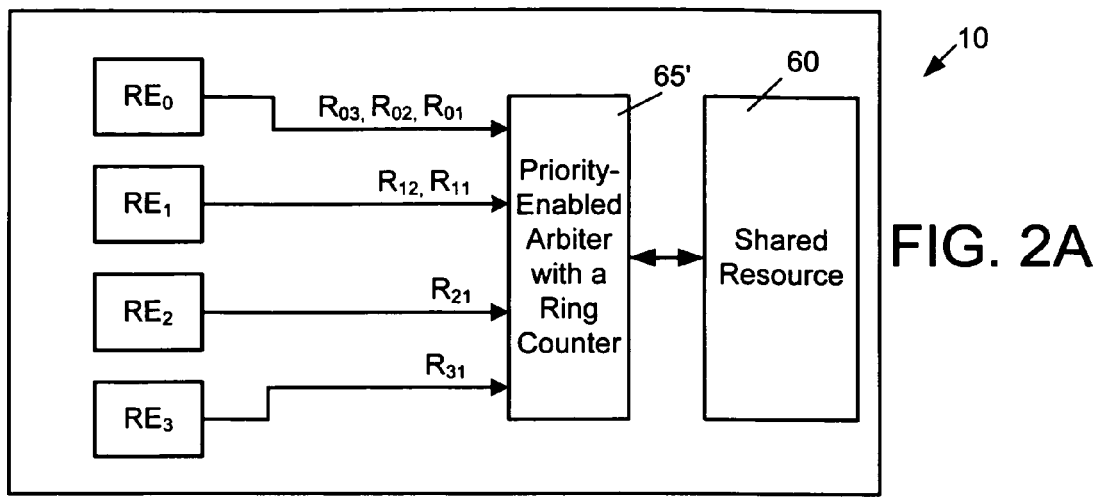
FIG. 2A shows an arbiter with a ring counter placed between requesting entities and a shared resource, in accordance with one embodiment of the present invention

FIG. 2A shows a priority-encoded arbiter 65' with a ring counter, placed between requesting entities, $RE_0$, $RE_1$, $RE_2$, and $RE_3$, and a shared resource 60, in accordance with one embodiment of the present invention. The priority-encoded arbiter 65' with a ring counter recognizes the priority associated with each request. The arbitration logic circuitry in the priority-encoded arbiter 65' with a ring counter allows the requests with different priorities, such as $R_{01}$, $R_{02}$, and $R_{03}$ from highest priority requesting entity $RE_0$, $R_{11}$, and $R_{12}$ from second-high priority requesting entity $RE_1$, $R_{21}$ from low priority $RE_2$, and $R_{31}$ from low priority $RE_3$ as discussed above, to access the shared resource 60 without starvation. The requests $R_{01}$, $R_{02}$, $R_{03}$, $R_{11}$, $R_{12}$, $R_{21}$, and $R_{31}$ are encoded with weight to differentiate the priorities of the requesting entities (or function units) they are from.

Figure 2B:
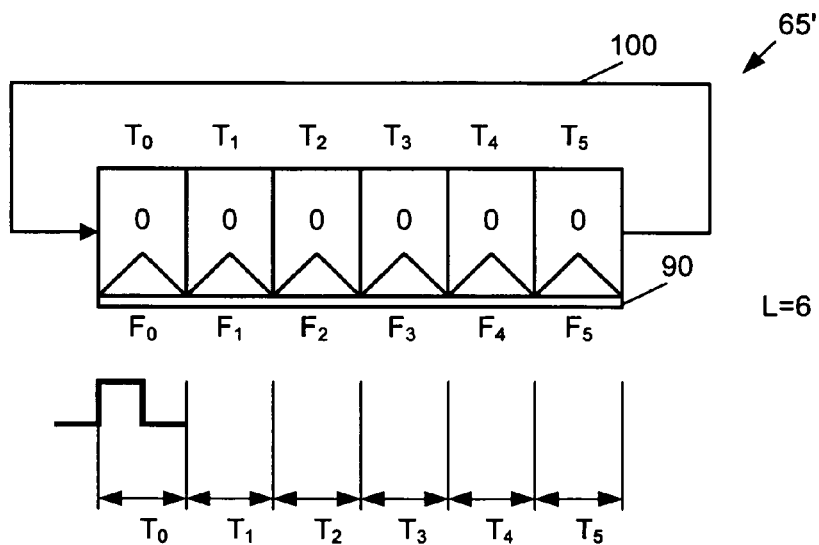
FIG. 2B shows an arbiter with a ring counter of six rings, in accordance with one embodiment of the present invention.
Figures 2C, 2D:
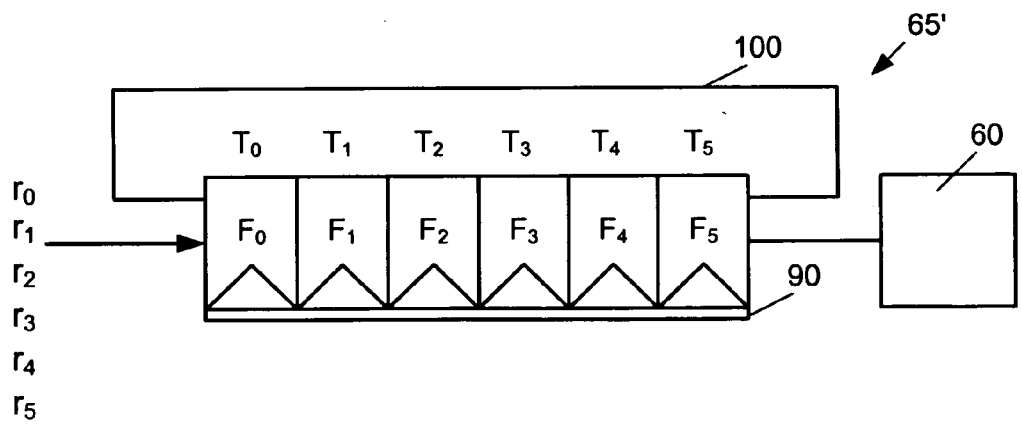
FIG. 2C shows the sequential turning from 0 to 1 of the six memory cells of FIG. 2B, in accordance with one embodiment of the present invention.
FIG. 2D six requests being assigned to six time slots, in accordance with one embodiment of the present invention.

In one embodiment, the priority-encoded arbiter 65' includes a ring counter, with the ring length L. FIG. 2B shows an embodiment of the priority-encoded arbiter 65' with a ring counter of six rings (L=6). Each ring is a memory cell, such as a flip/flop. In one embodiment, the flip/flop is a D flip/flop. In the embodiment of FIG. 2B, the memory cells are flip/flops. The six rings are rings $F_0$, $F_1$, $F_2$, $F_3$, $F_4$, and $F_5$ and the six rings (flip/flops) are coupled together in series and the six rings are coupled to the arbitration logic circuitry 90. The flip/flops are driven by a clock (not shown). The arbitration logic circuitry is configured to determine the order of access granted to the requests. The six rings with a return path 100 are part of the arbiter 65'. The initial values of all six flip/flops are all zero. When time is at $T_0$, flip/flop (or ring) $F_0$ is turned from 0 to 1. At time $T_1$, the flip/flop $F_1$ is turned to 1, while flip/flop $F_0$ is turned back to zero. As time progresses through $T_2$, $T_3$, $T_4$, and $T_5$, flip/flops $F_2$, $F_3$, $F_4$ and $F_5$ are turned to 1 sequentially, as shown in FIG. 2C, in accordance with one embodiment of the present invention. At $T_5$ the $6^{th}$ ring counter $F_5$ is reached. At next time segment, $T_6$, the ring counter routes back to the $1^{st}$ ring counter, $F_0$. $T_0$, $T_1$, $T_2$, $T_3$, $T_4$, $T_5$, and $T_6$ are clock periods. In one embodiment, the clock that drives the flip/flops is in the microprocessor 10. In one embodiment, the clock is in the arbiter 65'. In one embodiment, the clock that drives the flip/flops is in the arbitration logic circuitry 90. In another embodiment, the arbitration logic circuitry 90 is coupled to the clock.

FIG. 2D shows 6 requests $r_0$, $r_1$, $r_2$, $r_3$, $r_4$, and $r_5$ waiting in the pipeline to access the shared resource, in accordance to one embodiment of the present invention. Within $r_0$, $r_1$, $r_2$, $r_3$, $r_4$, and $r_5$, the priority sequence is in the order $r_0 > r_1 > r_2 > r_3 = r_4 = r_5$. When $F_0 = 1$, during $T_0$, the access is assigned to $r_0$. When $F_1 = 1$, during $T_1$, the access is assigned to $r_1$. The assignment of access follows the sequence of as shown in FIG. 2D and below:

At t=$T_0$, $F_0$=1, access granted to $r_0$,
At t=$T_1$, $F_1$=1, access granted to $r_1$,
At t=$T_2$, $F_2$=1, access granted to $r_2$,
At t=$T_3$, $F_3$=1, access granted to $r_3$,
At t=$T_4$, $F_4$=1, access granted to $r_4$, and
At t=$T_5$, $F_5$=1, access granted to $r_5$.

All requests in queue are granted access to the shared resource.

Figure 2E:
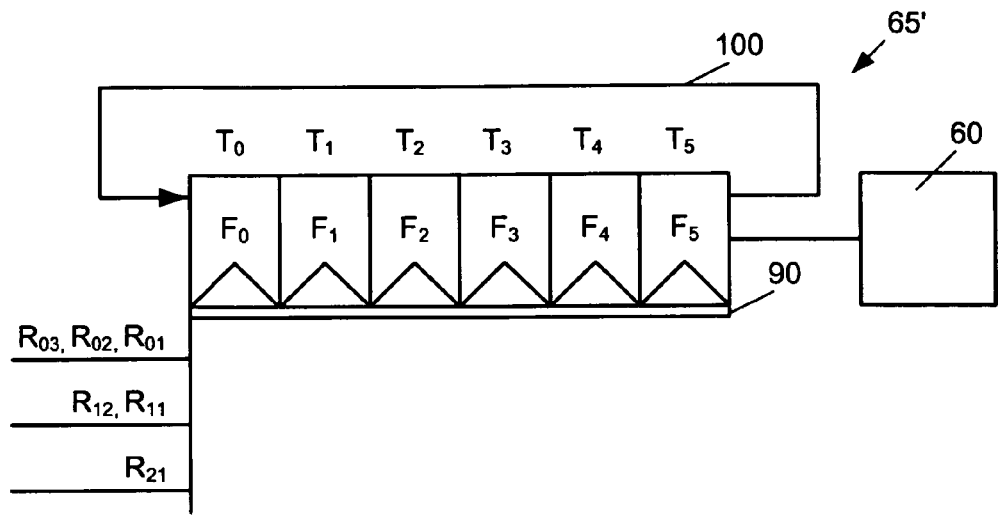
FIG. 2E six requests being assigned to six time slots, in accordance with another embodiment of the present invention.

FIG. 2E shows 6 requests $r_{01}$, $r_{02}$, $r_{03}$, $r_{11}$, $r_{12}$, $r_{21}$, and $r_{22}$ waiting in the pipeline to access the shared resource, in accordance to another embodiment of the present invention. $r_{01}$, $r_{02}$, $r_{03}$ are requests sent by request entity $RE_0$. $r_{11}$ and $r_{12}$ are requests sent by request entity $RE_1$. $r_{21}$ is a request sent by request entity $RE_2$. The priority of request entity $RE_0$ is higher than request entity $RE_1$, and the priority of request entity $RE_1$ is higher than request entity $RE_2$. The assignment of access by the priority-encoded arbiter 65' follows the sequence as shown in FIG. 2E and below:

At t=$T_0$, $F_0$=1, access granted to $r_{01}$,
At t=$T_1$, $F_1$=1, access granted to $r_{11}$,
At t=$T_2$, $F_2$=1, access granted to $r_{21}$,
At t=$T_3$, $F_3$=1, access granted to $r_{02}$,
At t=$T_4$, $F_4$=1, access granted to $r_{03}$, and
At t=$T_5$, $F_5$=1, access granted to $r_{12}$.

The requests are first granted to requests from each requesting entity $RE_0$, $RE_1$, or $RE_2$, following the "round robin" scheme. $r_{01}$ of $RE_0$ and $r_{11}$ of $RE_1$, and $r_{21}$ of $RE_2$ are granted access to the shared resource. "Round robin" scheme grants access to one request from each requesting entity evenly. Once at least one request $r_{01}$, $r_{11}$ $r_{21}$ from the three requesting entities $RE_0$, $RE_1$, and $RE_2$ are granted access using the first three ring counters $F_0$, $F_1$, and $F_2$, ring counters $F_3$, $F_4$, and $F_5$ can be used to grant access for additional requests from high priority requesting entities, such as $r_{02}$, $r_{03}$ and $r_{12}$. Since $r_{02}$ and $r_{03}$ are requests from requesting entity $RE_0$, which has the highest priority, they are granted access before $r_{12}$ and $r_{22}$. After $r_{02}$ and $r_{03}$ are granted access, $r_{12}$ is granted access when $F_5$=1. Although during this round, $r_{22}$ is not granted access, $r_{22}$ will be granted access during next round. In addition, request $r_{21}$ from low priority requesting entity $RE_2$ is granted access. Requests from low priority requesting entities are not starved of the access opportunities.

The priority-encoded arbiter 65' with a ring counter utilizes the number flip/flops, which are memory cells, in ring counter that are equal to the number of requesting entities to perform a "round robin" grant of access to one request per requesting entity. In this case, there are three requesting entities, $RE_0$, $RE_1$ and $RE_2$. $r_{01}$ of $RE_0$, and $r_{11}$ of $RE_1$, and $r_{21}$ of $RE_2$ are granted access first. The priority-encoded arbiter 65' with a ring counter then utilizes the remaining flip/flops to grant access to requests, such as $r_{02}$, $r_{03}$, and $r_{12}$, according to priority.

Figure 3:
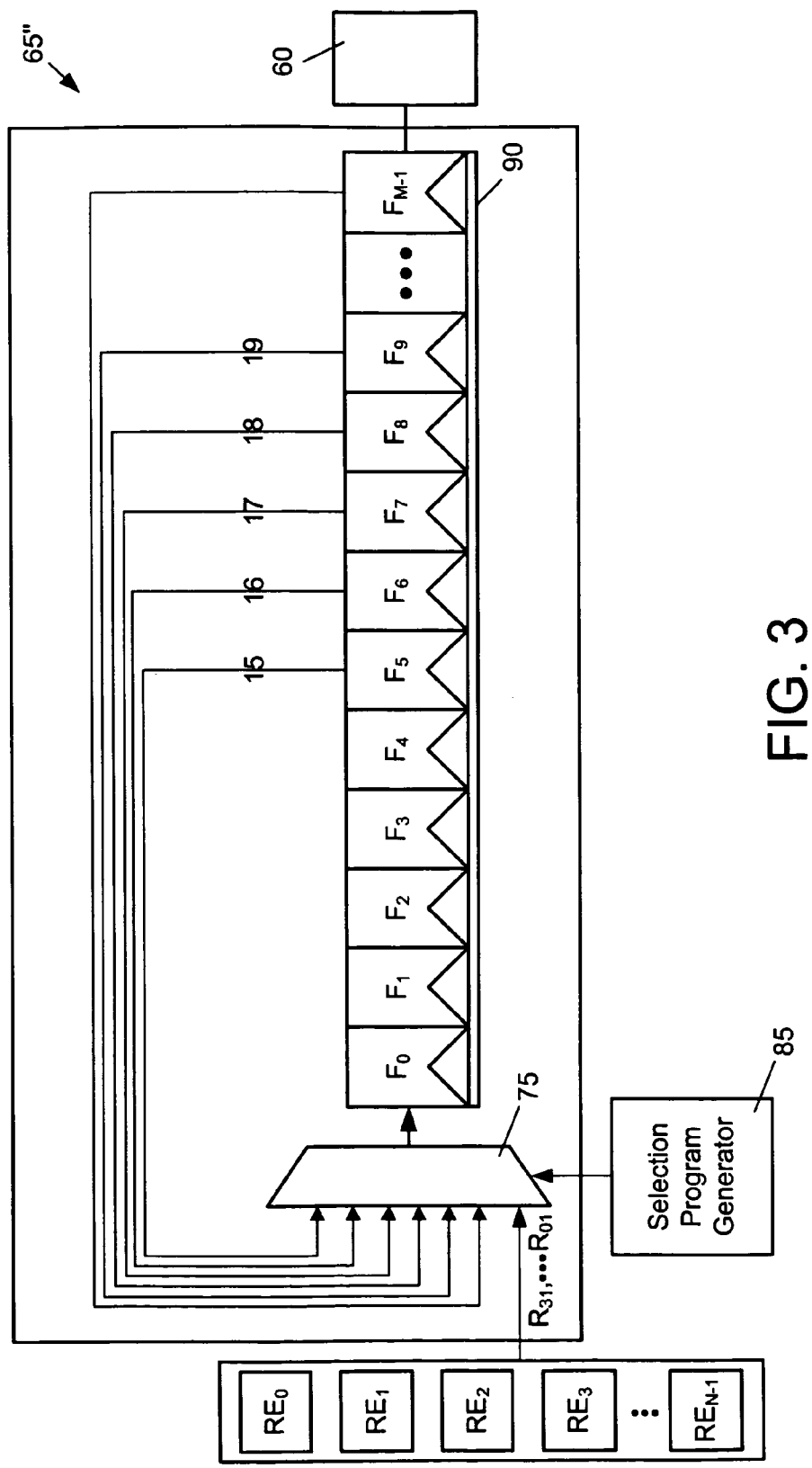
FIG. 3 shows an arbiter with adjustable ring counter, in accordance with one embodiment of the present invention.

The example shown above has the length L of the ring counter to be six. However, the length of the ring be adjusted to change the percentage of accesses granted to high priority requests. FIG. 3 shows an embodiment of the priority-encoded arbiter 65" with adjustable ring counter in accordance with the present invention. The priority-encoded arbiter 65" has M number of flip/flops (or ring counter with length=M), $F_0$, $F_1$, ..., and $F_{M-1}$, coupled to the arbitration logic circuitry 90. In one embodiment, The flip/flops $F_0$, $F_1$, ..., and $F_{M-1}$ are coupled to a multiplexer (mux) 75. Mux 75 is coupled to the beginning of the string of flip/flops, which is $F_0$. The mux 75 receives a "select" instruction from a select program 85. The select program generator 85 issues instruction to mux 75 to tell the mux 75 the length of the ring counter. For example, if the length of the ring counter is six (L=6). The select program generator 85 would issue an instruction to mux 75 to activate the connection between the return path 15, which is coupled to flip/flop $F_5$, to mux 75. When the return path 15 is activated, the length of the ring counter is set at 6. If the length of the ring counter is to be set at ten (L=10), the function unit 85 would issue an instruction to mux 75 to activate the connection between the return path 19, which is coupled to flip/flop $F_9$, to mux 75. When the return path 19 is activated, the length of the ring counter is set at 10. Coupling the mux 75 and the selection program generator 85 to the ring counters with M number of flip/flops with returning paths allow the length of the ring counter to be adjusted, as shown in FIG. 3.

FIG. 3 also shows N number of requesting entities, $RE_0$, $RE_1$, $RE_2$, ..., $RE_{N-1}$ coupled to the priority-encoded arbiter 65" with adjustable ring counter, in accordance with one embodiment of the present invention. The length of the ring counter is set at L in the priority-encoded arbiter 65". There are N requesting entities, $RE_0$, $RE_1$, $RE_2$, ..., $RE_{N-1}$, trying to access the shared resource 60. The number of ring counter L has to be at least equal to the number of requesting entities N. If L=N, the priority-encoded arbiter 65" grants access according to the "round robin" scheme. If L is greater than N, the requests from high priority requesting entities could be handled with higher priority than requests with low priorities. For example, if L=6, and N=3, there 3 out of the 6 ring counters are used to grant access to high priority requests, as explained above in FIG. 2E. This means that 50% of the ring counters are used to grant access to high priority requests, which means that 50% of accesses are mainly used by high priority requests. Equation (1) shows the percentage of ring counters used to grant high priority requests.

$$\% \text{ of ring counters used to handle high priority requests} = (L-N)/L * 100\% \tag{1}$$

If there are a lot of requests from high priority requesting entities, the length L of the ring counter can be adjusted to a higher value to reduce the traffic of requests from high priority requesting entities. If there are relatively few requests from high priority requesting entities, the length L of the ring counter can be adjusted to a lower value to ensure the accesses to the shared resource(s) are properly granted.

Figure 4:
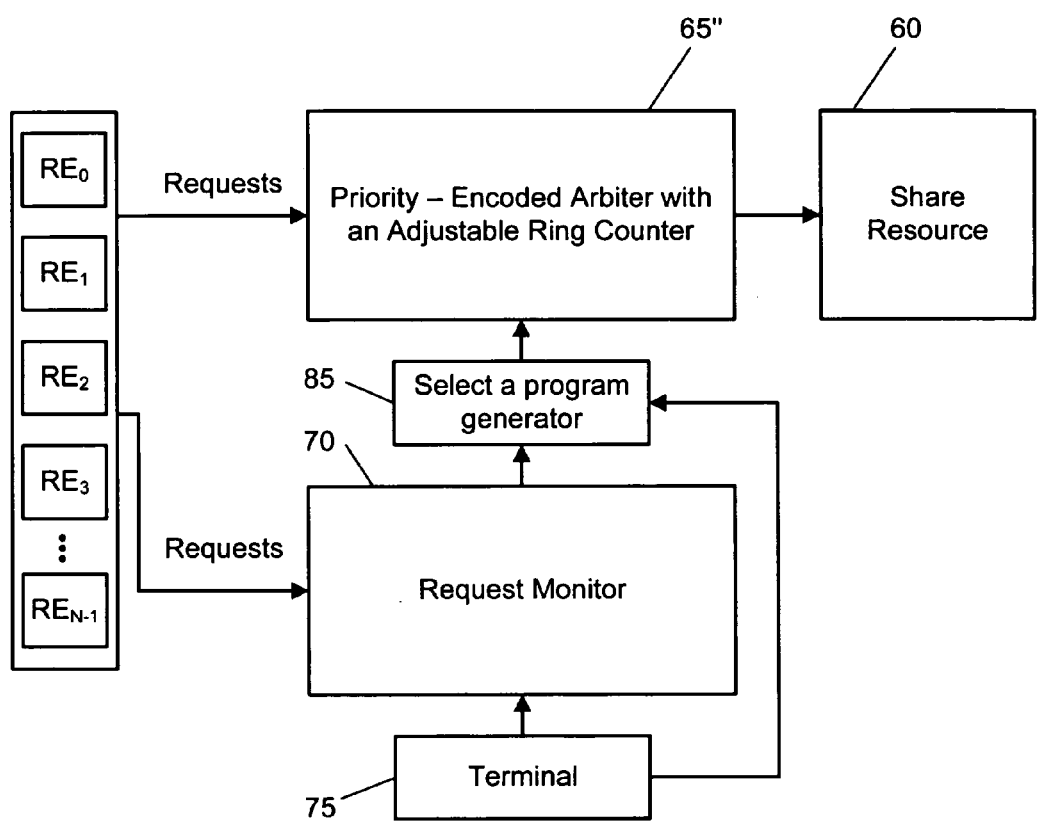
FIG. 4 shows a request monitor coupled to requesting entities and an arbiter with adjustable ring counter, in accordance with one embodiment of the present invention.

The length of the ring counter L can be adjusted to control the requests in the pipeline. In one embodiment, the requesting entities $RE_0$, $RE_1$, $RE_2$, ..., $RE_{N-1}$ are coupled to a request monitor 70, which monitors how the flow of requests from the requesting entities $RE_0$, $RE_1$, $RE_2$, ... $RE_{N-1}$ are being processed by priority-encoded arbiter 65" to gain access to the shared resource 60, as shown in FIG. 4, in accordance with one embodiment of the present invention. The request monitor 70 then sends the monitoring information to the selection program generator 85, which in turn issues instruction to priority-encoded arbiter 65" to adjust the length of the ring counter L. If there are many requests from the high priority requesting entities in the pipeline, L value can be increased to reduce the congestion. However, if the requests from the high priority requesting entity are low in the pipeline while requests from the low priority requesting entities are piling up, the L value can be decreased to allow the requests from the low priority requesting entities being handled at a faster rate. In another embodiment, the monitoring information from the request monitor 70 is shown on a terminal 75 to a user (not shown). After the user view the monitoring information, the user can issue a command with the L value to the selection program generator 85. The selection program generator 85 then issues a select command to the priority-encoded arbiter 65" to change the length L of the ring counter. In one embodiment, the selection program generator 85 is integrated in the arbiter 65. In one embodiment, the selection program generator 85 is integrated in the request monitor 70.

Figure 5:
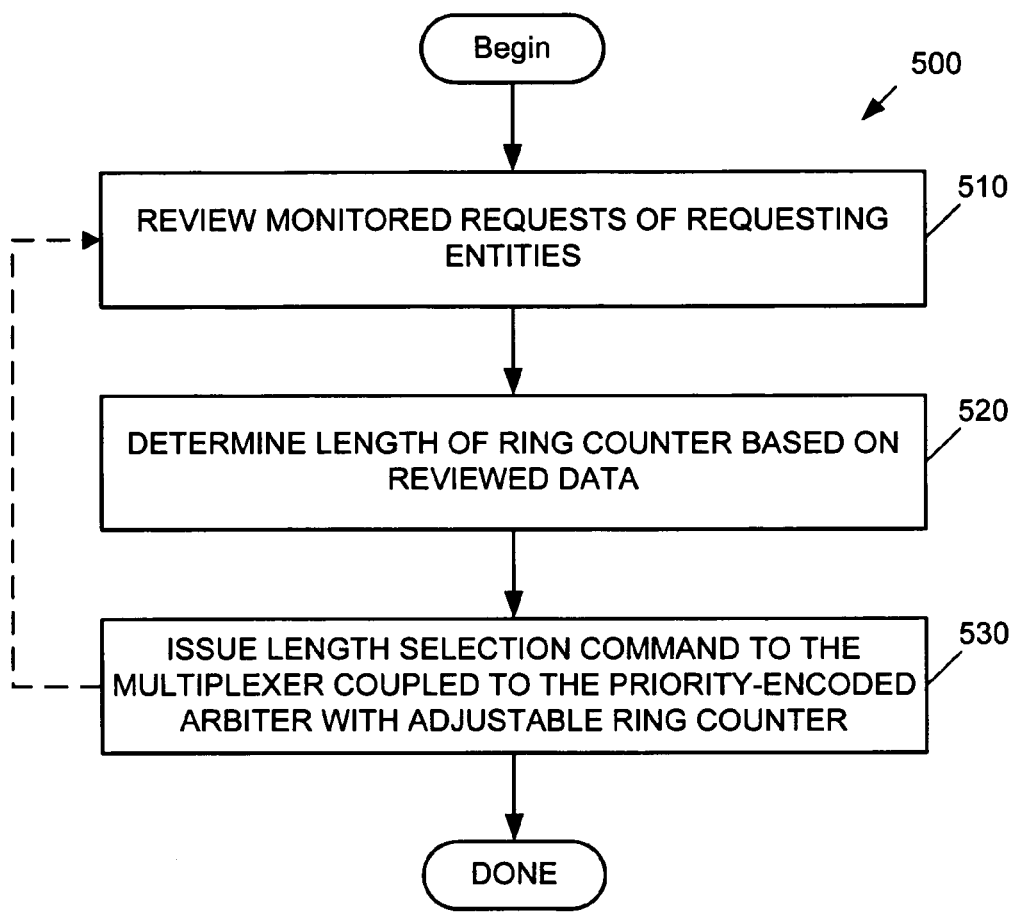
FIG. 5 shows a process flow of setting the length of the ring counter of the priority-encoded arbiter with adjustable ring counter, in accordance with one embodiment of the present invention.

FIG. 5 shows a process flow 500 of setting the length of the ring counter of the priority-encoded arbiter with adjustable ring counter 65", in accordance with one embodiment of the present invention. The process flow 500 is used to adjust the length of the ring counter after an initial length has been used. At step 510, the monitored requests of the requesting entities are reviewed. As described above, the requests are reviewed by a request monitor. The requests data can be reviewed by a user (human) or by a device with software to analyze the data. At step 520, the user or the reviewing device determines the length of the ring counter based on the reviewed request data. The user or the device can analyze the request data and learned that requests from high priority entities are piling up and need to be handled at a faster rate. Under such a circumstance, the user or the device (with the necessary software) determines to increase the length of the ring counter to increase the percentage of resources being used by the high-priority requesting entities. Conversely, if the requests from the low-priority requesting entities have accumulated significantly, the user or the device could decrease the length of the ring counter. Alternatively, the user or the device could determine that the current length is just about right and decide not to change the length. At step 530, a command is issued by the user or the device to select the length of the ring counter. The selected length could be longer, shorter or the same length compared to the previous value. The monitoring and length control can be on-going; therefore, after step 530, the process can return to step 510 and continue the loop, until there is no longer need to monitor the performance of the priority-encoded arbiter.

The integration of the various embodiments of arbiter described above with shared resource(s), requesting entities, selection program generator, and request monitor could involve additional micro programs (or micro codes) not described here.

The embodiments of the present invention provide methods and apparatus using an arbiter in a microprocessor that can handle requests to access a shared resource from function units with different priorities without starving the access opportunities of requests from function units with low priority. In one embodiment, the priority-encoded arbiter has a ring counter with variable length to control the percentage of access assigned to requests from function units of high priorities. The remaining percentage of access is divided evenly among requests from all function units with no differentiation of priority. The methods and apparatus using the arbiter grant access to requests from function units with different priorities without starving the access opportunities of requests from function units with low priority. At the same time, requests from function units with higher priority are granted accesses to the shared resource at higher rates than requests from function units with lower priorities.

The application of the concept of the present invention is not limited to microprocessor. Hardware chips, such as application-specific integrated circuit (ASIC), field programmable gate array (FPGA), can also utilize the arbiter described above, as long as there is a need to arbitrate among requests of varying priority. In addition, the concept of the invention can also be applied to create an arbiter outside a hardware chip to arbitrate requests to access a shared resource on the hardware chip, as long as the requests are of varying priorities.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A microprocessor comprising:
   a shared resource;
   a plurality of requesting entities accessing the shared resource, wherein each of the plurality of requesting entities has a priority value and requests from the each of the plurality of requesting entities are assigned the priority value, the plurality of requesting entities being function units of the microprocessor; and
   a priority-encode arbiter with an adjustable ring counter disposed between the shared resource and the plurality of requesting entities to control overall requests of the plurality of requesting entities to the shared resource, wherein the adjustable ring counter includes arbitration logic circuitry coupled to a plurality of memory cells being coupled in series, the plurality of memory cells having a first memory cell and a last memory cell, the first memory cell being coupled to a multiplexer, the last memory cell being coupled to the shared resource, wherein the plurality of memory cells are flip/flops driven by a clock, the initial value of the plurality of memory cells being a first value, each of the plurality of the memory cells takes turns to have a second value while others have the first value as clock cycles of the clock progress, there being a plurality of return paths, each of the plurality of return paths being coupled to a unique memory cell of the plurality of memory cells at one end and the multiplexer at the other end.

2. The microprocessor of claim 1, wherein the priority-encoded arbiter with the adjustable ring counter grants more access to requests with higher priority values and does not starve access of the requests with lower priority values.

3. The microprocessor of claim 1, wherein the multiplexer receives a selection command from a selection program generator to select one of the plurality of return paths coupled to a particular memory cell to determine a length of the adjustable ring counter, the length being determined by the number of memory cells between the particular memory cell and the multiplexer.

4. The microprocessor of claim 3, wherein the length is L, L being an integer, and the number of the plurality of requesting entities is N, L being an integer, a percentage of access of the shared resource assigned to requests with high priority values being (L−N)/L*100%.

5. The microprocessor of claim 1, wherein the priority-encoded arbiter with the adjustable ring counter grants access to one request from each of the plurality of requesting entities first before granting access to requests with high priority values of the overall requests of the plurality of requesting entities that are not granted access yet.

6. The microprocessor of claim 1, further comprising:
   a request monitor being coupled to the plurality of requesting entities to monitor the requests of the plurality of requesting entities to access the shared resource, wherein results of the request monitor are used to set a length of the adjustable ring counter.

7. The microprocessor of claim 1, further comprising:
   a selection program generator coupled to the multiplexer, wherein the selection program generator issues a selection command to set a length of the adjustable ring counter.

8. The microprocessor of claim 1, wherein the number of the plurality of requesting entities is lower than the length of the adjustable ring counter.

9. The microprocessor of claim 1, wherein the plurality of memory cells are flip/flops driven by a clock.

10. A priority-encoded arbiter with an adjustable ring counter to arbitrate requests from a plurality of requesting entities to access a shared resource, comprising:
    an arbitration logic circuitry, wherein the arbitration logic circuitry recognizes priority values associated with the requests;
    a plurality of memory cells coupled in series, wherein the plurality of memory cells are coupled to the arbitration logic circuitry, the plurality of memory cells having a first memory cell and a last memory cell, wherein the plurality of memory cells are flip/flops driven by a clock, the initial value of the plurality of memory cells being a first value, each of the plurality of the memory cells takes turns to have a second value while others have the first value as clock cycles of the clock progress; and
    a multiplexer, wherein the first memory cell is coupled to the multiplexer and the last memory cell is coupled to the shared resource, there being a plurality of return paths, each of the plurality of return paths being coupled to a unique memory cell of the plurality of memory cells at one end and the multiplexer at the other end.

11. The priority-encoded arbiter with an adjustable ring counter of claim 10, wherein the priority-encoded arbiter with the adjustable ring counter is disposed between the shared resource and a plurality of requesting entities accessing the shared resource to control the requests of the plurality of requesting entities to the shared resource, each of the plurality of requesting entities has an associated priority value and requests from the each of the plurality of requesting entities being assigned the associated priority value.

12. The priority-encoded arbiter with an adjustable ring counter of claim 10, wherein the priority-encoded arbiter with the adjustable ring counter grants more access to requests with higher priority values and does not starve access of the requests with lower priority values.

13. The priority-encoded arbiter with an adjustable ring counter of claim 10, wherein the multiplexer receives a selection command from a selection program generator to select one of the plurality of return paths coupled to a particular memory cell to determine a length of the adjustable ring counter, the length being determined by the number of memory cell between the particular memory cell and the multiplexer.

14. The priority-encoded arbiter with an adjustable ring counter of claim 13, wherein the length is L, L being an integer, and the number of the plurality of requesting entities is N, L being an integer, a percentage of access of the shared resource assigned to requests with high priority values being (L−N)/L*100%.

15. The priority-encoded arbiter with an adjustable ring counter of claim 11, wherein the priority-encoded arbiter with the adjustable ring counter grants access to one request from each of the plurality of requesting entities first before granting access to requests with high priority values of the requests from the plurality of requesting entities that are not granted access yet.

16. The priority-encoded arbiter with an adjustable ring counter of claim 11, wherein a request monitor is coupled to the plurality of requesting entities to monitor the requests of the plurality of requesting entities to access the shared resource, wherein results of the request monitor are used to set a length of the adjustable ring counter.

17. The priority-encoded arbiter with an adjustable ring counter of claim 10, further comprising:
- a selection program generator coupled to the multiplexer, wherein the selection program generator issues a selection command to set a length of the adjustable ring counter.

18. A microprocessor, comprising:
a shared resource;
a plurality of requesting entities accessing the shared resource, wherein each of the plurality of requesting entities has an associated priority value and requests from the each of the plurality of requesting entities are assigned the associated priority value, the plurality of requesting entities being function units of the microprocessor; and
a priority-encoded arbiter with an adjustable ring counter disposed between the shared resource and the plurality of requesting entities to control overall requests of the plurality of requesting entities to the shared resource, wherein the adjustable ring counter includes arbitration logic circuitry coupled to a plurality of memory cells being coupled in series, the plurality of memory cells having a first memory cell and a last memory cell, the first memory cell being coupled to a multiplexer, the last memory cell being coupled to the shared resource, wherein the plurality of memory cells are flip/flops driven by a clock, the initial value of the plurality of memory cells being a first value, each of the plurality of the memory cells takes turns to have a second value while others have the first value as clock cycles of the clock progress, there being a plurality of return paths, each of the plurality of return paths being coupled to a unique memory cell of the plurality of memory cells at one end and the multiplexer at the other end, wherein the priority-encoded arbiter with the adjustable ring counter grants more access to requests with higher priority values and does not starve access of the requests with lower priority values.

19. The microprocessor of claim 18, the first value being 0 and the second value being 1, or the first value being 1 and the second value being 0.

20. The microprocessor of claim 19, wherein the multiplexer receives a selection command from a selection program generator to select one of the plurality of return paths coupled to a particular memory cell to determine a length of the adjustable ring counter, the length being determined by the number of memory cells between the particular memory and the multiplexer.

* * * * *